(12) United States Patent
Yen et al.

(10) Patent No.: US 11,870,477 B2
(45) Date of Patent: Jan. 9, 2024

(54) TRANSMISSION STRUCTURE OF ANTENNA AND PROXIMITY SENSING CIRCUIT

(71) Applicant: SENSORTEK TECHNOLOGY CORP., Jhubei (TW)

(72) Inventors: Yu-Meng Yen, Jhubei (TW); Chih-Yu Lin, Jhubei (TW)

(73) Assignee: Sensortek Technology Corp., Jhubei (TW)

( * ) Notice: Subject to any disclaimer, the term of this patent is extended or adjusted under 35 U.S.C. 154(b) by 0 days.

(21) Appl. No.: 17/218,625

(22) Filed: Mar. 31, 2021

(65) Prior Publication Data

US 2022/0021408 A1  Jan. 20, 2022

Related U.S. Application Data

(60) Provisional application No. 63/002,366, filed on Mar. 31, 2020.

(51) Int. Cl.
*H04B 1/3827* (2015.01)
*H01Q 1/24* (2006.01)

(52) U.S. Cl.
CPC ........... *H04B 1/3838* (2013.01); *H01Q 1/245* (2013.01)

(58) Field of Classification Search
CPC .... H04B 1/3838; H01Q 1/245; H01Q 9/0421; H01Q 1/52; H01Q 5/30; H01Q 23/00
See application file for complete search history.

(56) References Cited

U.S. PATENT DOCUMENTS 5,541,609 A * 7/1996 Stutzman ............... H01Q 21/10
                                                                343/702
6,985,113 B2 * 1/2006 Nishimura ............... H01Q 3/44
                                                                343/702
(Continued)

FOREIGN PATENT DOCUMENTS

CN          1398015 A       2/2003
CN          1401144 A       3/2003
(Continued)

OTHER PUBLICATIONS

Office Action mailed to Chinese Corresponsing Patent Application No. 202110349765.6 dated Mar. 25, 2023.

*Primary Examiner* — Jinsong Hu
*Assistant Examiner* — Rui M Hu
(74) *Attorney, Agent, or Firm* — Rosenberg, Klein & Lee

(57) ABSTRACT

The present application provides a transmission structure of an antenna and a proximity sensing circuit. The transmission structure includes a transmission line and at least one radio-frequency short-circuit element, a first coupling end of the transmission line is coupled to an antenna, and a second coupling end of the transmission line is coupled to a proximity sensing circuit, and the at least one radio-frequency short-circuit element is coupled between the transmission line and a ground, and is located between the antenna and the proximity sensing circuit. Utilizing the at least one radio-frequency short-circuit element in conjunction with the transmission line so that the transmission path between the antenna and the proximity sensing circuit has the high impedance, and hence preventing a radio-frequency signal from the antenna from affecting the sensing accuracy of the proximity sensing circuit.

12 Claims, 4 Drawing Sheets

(56) References Cited

U.S. PATENT DOCUMENTS

| | | | | |
|---|---|---|---|---|
| 7,146,139 B2* | 12/2006 | Nevermann | H04B 1/3838 | 343/702 |
| 8,224,400 B2* | 7/2012 | Dou | H03G 3/3042 | 455/574 |
| 8,629,813 B2* | 1/2014 | Milosavljevic | H01Q 1/38 | 343/852 |
| 9,478,870 B2* | 10/2016 | Desclos | H01Q 1/243 | |
| 9,509,042 B1 | 11/2016 | Zheng | H01Q 1/48 | |
| 9,608,331 B1* | 3/2017 | Rowson | H01Q 9/16 | |
| 9,746,571 B2* | 8/2017 | Juan | H01Q 1/48 | |
| 9,973,228 B2* | 5/2018 | Heikura | H01Q 5/378 | |
| 10,122,087 B2* | 11/2018 | Tang | H01Q 1/48 | |
| 10,128,924 B2* | 11/2018 | Chang | H04B 7/0608 | |
| 10,256,794 B2* | 4/2019 | Srirattana | H04B 1/44 | |
| 10,467,438 B1* | 11/2019 | Renner | G06F 11/2284 | |
| 10,651,552 B2* | 5/2020 | Lin | H01Q 1/242 | |
| 11,108,133 B2* | 8/2021 | Wu | H01Q 5/378 | |
| 2007/0222697 A1* | 9/2007 | Caimi | H01Q 9/0421 | 343/861 |
| 2009/0305742 A1* | 12/2009 | Caballero | H04W 52/283 | 455/566 |
| 2011/0012793 A1* | 1/2011 | Amm | H01Q 1/44 | 343/702 |
| 2011/0298674 A1 | 12/2011 | Hsu et al. | | |
| 2012/0119955 A1* | 5/2012 | Milosavljevic | H01Q 1/243 | 343/702 |
| 2012/0196549 A1* | 8/2012 | Hsu | H04B 1/3838 | 455/90.2 |
| 2012/0214412 A1* | 8/2012 | Schlub | H03K 17/955 | 455/41.1 |
| 2013/0127677 A1* | 5/2013 | Lin | H01Q 1/245 | 343/722 |
| 2013/0130633 A1* | 5/2013 | Lin | H01Q 1/245 | 343/866 |
| 2013/0137487 A1* | 5/2013 | Sato | H04B 1/3838 | 455/566 |
| 2013/0156080 A1* | 6/2013 | Cheng | H04M 1/72454 | 375/267 |
| 2013/0207872 A1* | 8/2013 | Bakalski | H01F 29/02 | 333/32 |
| 2013/0217342 A1* | 8/2013 | Abdul-Gaffoor | H03K 17/962 | 455/77 |
| 2013/0307740 A1* | 11/2013 | Pajona | H01Q 5/307 | 343/866 |
| 2013/0335258 A1* | 12/2013 | Chung | H04B 1/3838 | 342/27 |
| 2014/0071008 A1* | 3/2014 | Desclos | H01Q 19/021 | 343/745 |
| 2014/0315606 A1* | 10/2014 | You | H01Q 9/16 | 455/575.5 |
| 2014/0333494 A1* | 11/2014 | Huang | H01Q 5/328 | 343/720 |
| 2015/0116159 A1* | 4/2015 | Chen | H01Q 9/145 | 343/702 |
| 2015/0200447 A1* | 7/2015 | Tang | H01Q 1/243 | 343/720 |
| 2015/0222020 A1* | 8/2015 | Tai | H01Q 9/42 | 343/745 |
| 2015/0234077 A1* | 8/2015 | Komulainen | G01V 3/12 | 324/629 |
| 2015/0270619 A1* | 9/2015 | Zhu | H01Q 1/2266 | 343/702 |
| 2015/0303568 A1* | 10/2015 | Yarga | H01Q 5/321 | 343/722 |
| 2015/0372735 A1* | 12/2015 | Chang | H04B 7/0608 | 375/267 |
| 2016/0061983 A1* | 3/2016 | Heikura | H01Q 1/243 | 324/207.15 |
| 2016/0065260 A1* | 3/2016 | Heikura | H04B 1/3838 | 455/575.5 |
| 2016/0087343 A1* | 3/2016 | Chang | H01Q 5/378 | 343/720 |
| 2016/0365886 A1* | 12/2016 | Prendergast | H04W 52/18 | |
| 2017/0025740 A1* | 1/2017 | Li | H01Q 1/243 | |
| 2017/0033830 A1* | 2/2017 | Ramachandran | H04B 1/3838 | |
| 2017/0160416 A1* | 6/2017 | Juan | H01Q 9/42 | |
| 2018/0069295 A1* | 3/2018 | Han | H01Q 9/42 | |
| 2018/0212313 A1* | 7/2018 | Harper | H01Q 1/50 | |
| 2018/0233822 A1* | 8/2018 | Tang | H01Q 1/48 | |
| 2018/0261908 A1* | 9/2018 | Suh | H04B 1/0458 | |
| 2019/0027824 A1* | 1/2019 | Pajona | H01Q 7/00 | |
| 2020/0328501 A1* | 10/2020 | Kang | H01Q 5/335 | |
| 2020/0388919 A1* | 12/2020 | Kim | H01Q 5/314 | |
| 2021/0351509 A1* | 11/2021 | Lin | H01Q 5/328 | |

FOREIGN PATENT DOCUMENTS

| | | |
|---|---|---|
| CN | 104521149 A | 4/2015 |
| CN | 106201123 A | 12/2016 |
| CN | 206480773 U | 9/2017 |
| CN | 107968671 A | 4/2018 |
| CN | 109510631 A | 3/2019 |
| CN | 110474168 A | 11/2019 |
| CN | 110808438 A | 2/2020 |
| WO | 0249143 A1 | 6/2002 |

\* cited by examiner

TRANSMISSION STRUCTURE OF ANTENNA AND PROXIMITY SENSING CIRCUIT

FIELD OF THE INVENTION

The present application relates generally to a transmission structure, and particularly to a transmission structure of the antenna and the proximity sensing circuit.

BACKGROUND OF THE INVENTION

Nowdays, many electronic devices, such as mobile phones, include a proximity sensor for sensing proximity of a human body for adjusting some functions of the electronic devices. Take the power of the radio-frequency circuit for example. When the proximity sensor senses proximity of a human body to an electronic device, the power of the radio-frequency circuit may be lowered for controlling the specific absorption rate (SAR) within regulations and avoiding influencing people's health. In general, a sensing electrode will be disposed in the electronic device. The proximity sensor is coupled to the sensing electrode for sensing the capacitance of the sensing electrode. Then, according to the capacitance variation of the sensing electrode, whether a human body is proximate to the sensing electrode may be judged. Thereby, whether a human body is proximate to the electronic device may be determined.

According to the current technology, the antenna may be used as the sensing electrode. Thereby, no extra metal member is required to act as the sensing electrode and hence the cost may be reduced. The proximity sensor is coupled to the antenna and senses the capacitance of the antenna for sensing a human body being proximate to the electronic device. However, the radio-frequency signal received by the antenna will be transmitted to the proximity sensor via the transmission line between the antenna and the proximity sensor and thereby influencing the sensing accuracy of the proximity sensor. Then, whether a human body is proximate to the electronic device cannot be sensed accurately, let along lowering the power of the radio-frequency circuit during proximity of a human body to the electronic device and hence influencing the human health. In addition, proximity of a human body might be misjudged even when there is none and the power of the radio-frequency circuit might be lowered falsely. Consequently, the performance of the transmitting radio-frequency signal by the electronic device will be affected.

Given the above problems according to the prior art, the present application provides a transmission structure of the antenna and the proximity sensing circuit for avoiding transmission of the radio-frequency signal of the antenna to the proximity sensing circuit and thereby avoiding influences on the sensing accuracy of the proximity sensing circuit.

SUMMARY

An objective of the present application provides a transmission structure of antenna and proximity sensing circuit. By using at least one radio-frequency short-circuit element and a transmission line, the transmission path between the antenna and the proximity sensing circuit has high impedance and thus avoiding the influence of the radio-frequency signal in the antenna on the sensing accuracy of the proximity sensing circuit.

Another objective of the present application is to provide a transmission structure of antenna and proximity sensing circuit. A plurality of radio-frequency short-circuit elements and a transmission line are adopted. The radio-frequency short-circuit elements are located at different location of the transmission line and work with a selection circuit. The selection circuit selects the radio-frequency short-circuit element at the suitable location according to the current operating frequency band of the antenna. Thereby, the present application may be applied to antennas with multiple frequency bands.

The present application provides a transmission structure of antenna and proximity sensing circuit, which comprises a transmission line and at least one radio-frequency short-circuit element. A first coupling end of the transmission line is coupled to an antenna; and a second coupling end of the transmission line is coupled to a proximity sensing circuit. The at least one radio-frequency short-circuit element is coupled between the transmission line and a ground and located between the antenna and the proximity sensing circuit. By coupling the at least one radio-frequency short-circuit element to the transmission line, the transmission path between the antenna and the proximity sensing circuit has high impedance for avoiding the radio-frequency signal of the antenna from being transmitted to the proximity sensing circuit and thus avoiding influencing the sensing accuracy of the proximity sensing circuit.

The present application further discloses that the at least one radio-frequency short-circuit element includes a plurality of radio-frequency short-circuit elements and the transmission structure further includes a selection circuit. The selection circuit is coupled between the radio-frequency short-circuit elements and the ground and selects one of the radio-frequency short-circuit elements to be coupled to the ground. Thereby, the transmission structure according to the present application may be applied to an antenna with multiple frequency bands. The radio-frequency short-circuit element at the suitable location may be selected to be coupled to the ground according to the current operating frequency band of the antenna.

DETAILED DESCRIPTION

In the specifications and subsequent claims, certain words are used for representing specific elements/circuits/devices. A person having ordinary skill in the art should know that hardware manufacturers might use different nouns to call the same device. In the specifications and subsequent claims, the differences in names are not used for distinguishing devices. Instead, the differences in functions are the guidelines for distinguishing. In the whole specifications and subsequent claims, the word "comprising/including" is an open language and should be explained as "comprising/including but not limited to". Besides, the word "couple" includes any direct and indirect electrical connection. Thereby, if the description is that a first device is coupled to a second device, it means that the first device is connected electrically to the second device directly, or the first device is connected electrically to the second device via other device or connecting means indirectly.

Given that the antenna is used as the sensing electrode for proximity sensing, to avoid the influence of the radio-frequency signal of the antenna on the sensing accuracy of the proximity sensing circuit, the present application provides a transmission structure that adopts a transmission line coupled to a sensing circuit and an antenna as well as to at least one radio-frequency short-circuit element. Thereby, the transmission path between the antenna and the sensing circuit may have high impedance for preventing the influence of the radio-frequency signal of the antenna on the sensing of the sensing circuit.

Figure 1:
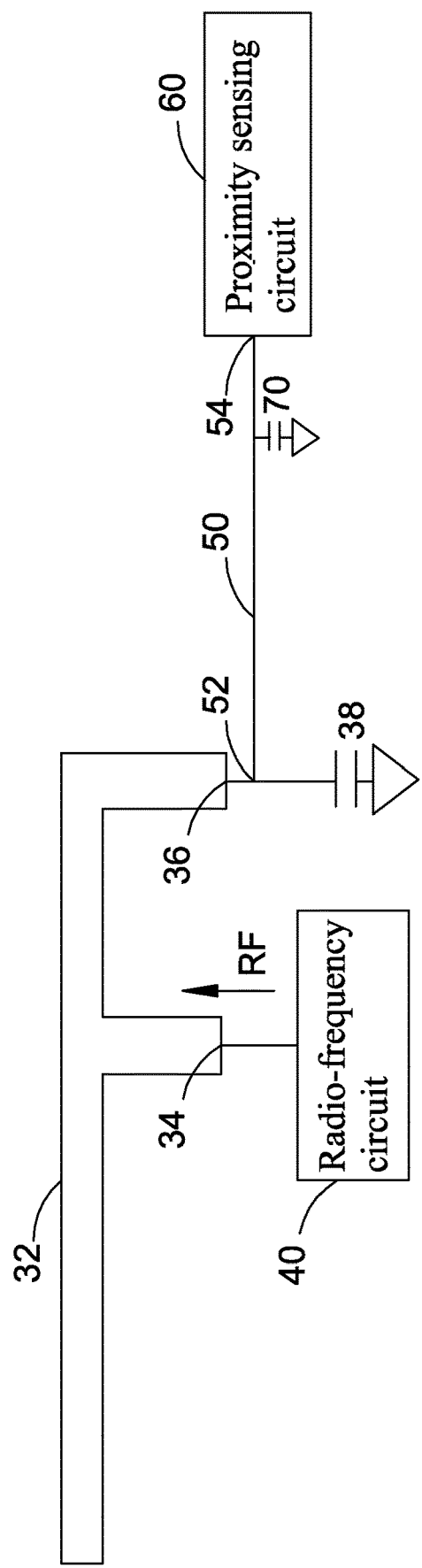
FIG. 1 shows a schematic diagram of the transmission structure according to the first embodiment of the present application.

Please refer to FIG. 1, which shows a schematic diagram of the transmission structure according to the first embodiment of the present application. As shown in the figure, the present embodiment provides a transmission structure of antenna and proximity sensing circuit. The transmission structure is coupled between an antenna 32 and a proximity sensing circuit 60. The antenna 32 and the proximity sensing circuit 60 are both disposed in an electronic device (not shown in the figure). In addition to receiving and transmitting wireless signals, the antenna 32 may be further used as the sensing electrode. The proximity sensing circuit 60 is coupled to the antenna 32 via the transmission structure and capable of sensing the capacitance of the antenna 32 for judging if a human body is proximate to the electronic device according to the variation in the capacitance of the antenna 32 and generating a proximity signal indicating the proximity of a human body to the electronic device. The proximity sensing circuit 60 may provide the proximity signal to the processor of the electronic device. The processor may control the functions of the electronic device according to the proximity signal. For example, when a human body is proximate to the electronic device, the processor may reduce the power of a radio-frequency circuit 40. According to an embodiment of the present application, the proximity sensing circuit 60 may be a proximity sensor used for controlling SAR. The antenna 32 includes a feed end 34 and a ground end 36. The feed end 34 of the antenna 32 is coupled to the radio-frequency circuit 40. The radio-frequency circuit 40 generates a radio-frequency signal RF and provides the radio-frequency signal RF to the antenna 32. The antenna 32 transmits the radio-frequency signal RF. The ground end 36 is coupled to a capacitor 38. The capacitor 38 is coupled to a ground. According to an embodiment of the present application, the antenna 32 may be an inverted-F-shaped antenna structure, a flat inverted-F-shaped antenna structure, or a helix antenna structure. The antenna 32 may have different structure according to the requirements and is not limited to the above examples.

According to the present embodiment, the transmission structure comprises a transmission line 50 and a radio-frequency short-circuit element 70. A first coupling end 52 of the transmission line 50 is coupled to the antenna 32; a second coupling end 54 of the transmission line 50 is connected to the proximity sensing circuit 60. The radio-frequency short-circuit element 70 is located between the antenna 32 and the proximity sensing circuit 60 and coupled between the transmission line 50 and the ground. According to an embodiment of the present application, since the radio-frequency short-circuit element 70 is coupled to the ground, the radio-frequency signal RF of the antenna 32 may be guided to the ground, acting like the radio-frequency signal RF is short-circuited. Thereby, the radio-frequency signal RF will not be transmitted to the proximity sensing circuit 60, meaning that the radio-frequency signal RF will not influence the sensing of the proximity sensing circuit 60. Based on the above description, the radio-frequency short-circuit element 70 is coupled between the transmission line 50 and the ground for short-circuiting the radio-frequency signal RF. Thereby, the transmission path between the antenna 32 and the proximity sensing circuit 60 is like opened and has high impedance for preventing the radio-frequency signal RF from being transmitted to the proximity sensing circuit 60. According to an embodiment of the present application, the first coupling end 52 of the transmission line 50 may be coupled to, but not limited to, the ground end 36 of the antenna 32. The transmission line 50 may be coupled to other locations of the antenna 32 according to the requirements.

The distance between the first coupling end 52 of the transmission line 50 and the radio-frequency short-circuit element 70 is between ¼ wavelength of the radio-frequency signal RF±⅛ wavelength of the radio-frequency signal RF. That is, the distance of the radio-frequency signal RF transmitted from the first coupling end 52 to the radio-frequency short-circuit element 70 via the transmission line 50 is between ¼ wavelength of the radio-frequency signal RF±⅛ wavelength of the radio-frequency signal RF. In other words, the distance between the location of the transmission line 50 coupled by the radio-frequency short-circuit element 70 and the first coupling end 52 is between ¼ wavelength of the radio-frequency signal RF±⅛ wavelength of the radio-frequency signal RF. Thereby, the impedance of the transmission path for the radio-frequency signal RF along the transmission line 50 may be increased. The locations (the short-circuit points) of the transmission line 50 coupled by the radio-frequency short-circuit element 70 may be determined according to the frequency band of the antenna 32. According to an embodiment of the present application, the radio-frequency short-circuit element 70 may be a capacitor with the capacitance determined according to the frequency band of the antenna 32, namely, the frequency of the radio-frequency signal RE According to the present embodiment, the transmission line 50 may be a straight transmission line.

Figure 2:
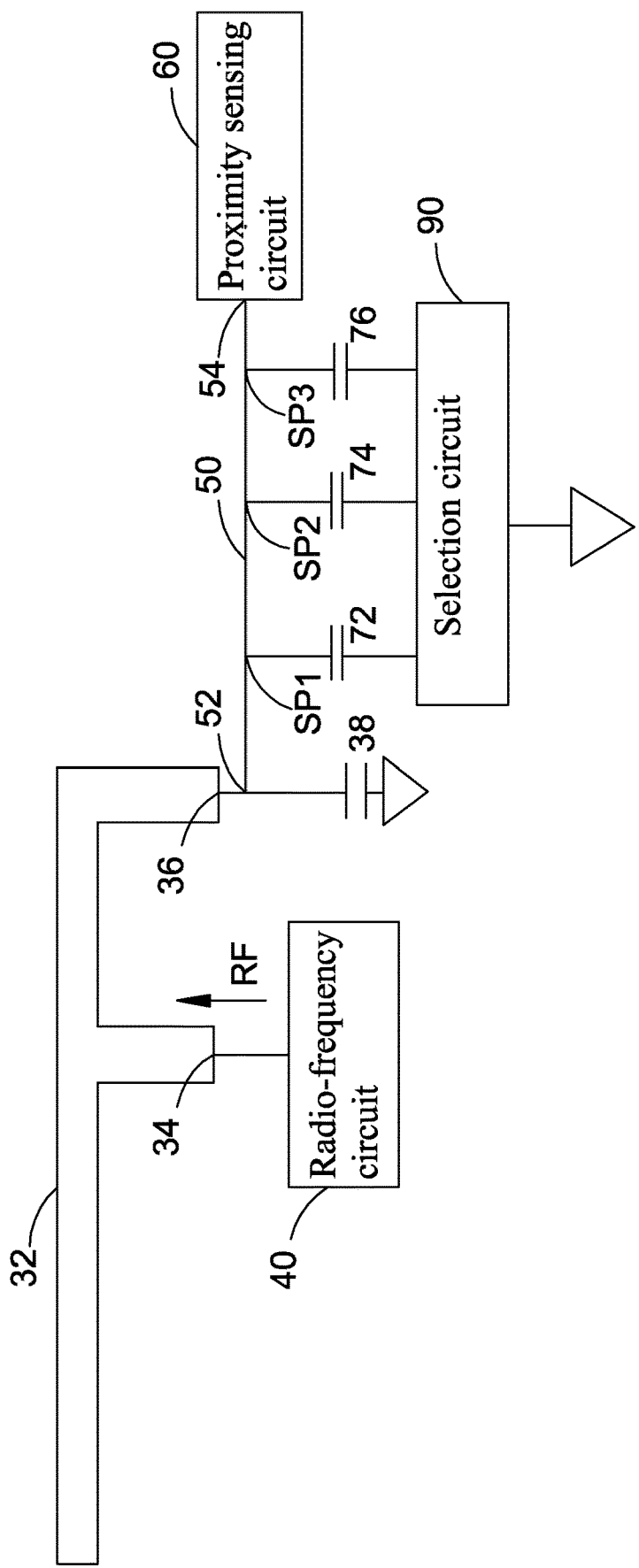
FIG. 2 shows a schematic diagram of the transmission structure according to the second embodiment of the present application.

Please refer to FIG. 2, which shows a schematic diagram of the transmission structure according to the second embodiment of the present application. As shown in the figure, according to the present embodiment, the transmission structure comprises a plurality of radio-frequency short-circuit elements 72, 74, 76 coupled at different locations of the transmission line 50. The locations of the transmission line 50 coupled by the radio-frequency short-circuit elements 72, 74, 76 are called the short-circuit points. In other words, according to the present embodiment, the transmission line 50 includes a plurality of short-circuit points SP1, SP2, SP3. Besides, the short-circuit points SP1, SP2, SP3 are located at different locations of the transmission lines 50. A selection circuit 90 is coupled between the radio-frequency short-circuit elements 72, 74, 76 and the ground. The selection circuit 90 may select one of the radio-frequency short-circuit elements 72, 74, 76 to be coupled to the ground.

According to the present embodiment, the respective distances between the radio-frequency short-circuit elements 72, 74, 76 and the first coupling end 52 of the transmission line 50 are different, making the radio-frequency short-circuit elements 72, 74, 76 corresponding to a plurality of frequency bands. For example, the antenna 32 may be applied to three frequency bands, including the high, middle, and low frequency bands. That is to say, the frequency of the radio-frequency signal RF may be high, middle, and low frequencies. When the antenna 32 is applied to the high frequency band, the selection circuit 90 may select the radio-frequency short-circuit element 72 closest to the first coupling end 52 to be coupled to the ground so that the high-frequency radio-frequency signal RF may be guided to the ground via the radio-frequency short-circuit element 72. The distance between the first coupling end 52 and the short-circuit point SP1 is between ¼ wavelength of the high-frequency radio-frequency signal RF±⅛ wavelength of the high-frequency radio-frequency signal RF. When the antenna 32 is applied to the low frequency band, the selection circuit 90 may select the radio-frequency short-circuit element 76 farthest to the first coupling end 52 to be coupled to the ground so that the low-frequency radio-frequency signal RF may be guided to the ground via the radio-frequency short-circuit element 76. The distance between the first coupling end 52 and the short-circuit point SP3 is between ¼ wavelength of the low-frequency radio-frequency signal RF±⅛ wavelength of the low-frequency radio-frequency signal RF. Likewise, when the antenna 32 is applied to the middle frequency band, the selection circuit 90 may select the radio-frequency short-circuit element 74 to be coupled to the ground so that the middle-frequency radio-frequency signal RF may be guided to the ground via the radio-frequency short-circuit element 74. The distance between the first coupling end 52 and the short-circuit point SP2 is between ¼ wavelength of the middle-frequency radio-frequency signal RF±⅛ wavelength of the middle-frequency radio-frequency signal RF. According to the above description, the transmission structure according to the present embodiment may be applied to the antenna 32 with multiple frequency bands. The selection circuit 90 may select the radio-frequency short-circuit elements 72, 74, 76 at the appropriate locations according to the current operating frequency band of the antenna 32. According to an embodiment of the present application, the radio-frequency circuit 40 may control the selection circuit 90 to select one of the radio-frequency short-circuit elements 72, 74, 76 to be coupled to the ground.

Figure 3:
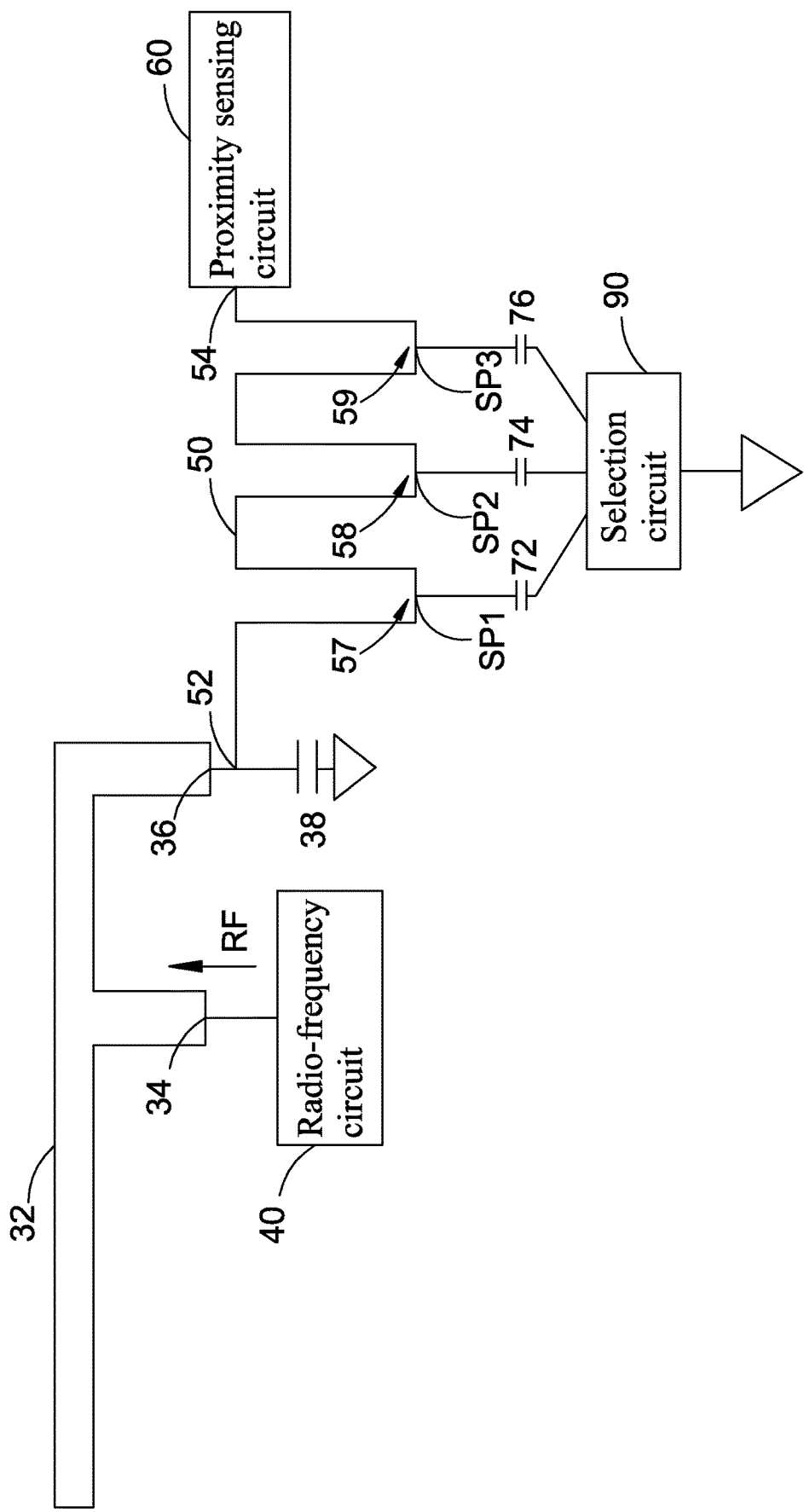
FIG. 3 shows a schematic diagram of the transmission structure according to the third embodiment of the present application.

Please refer to FIG. 3, which shows a schematic diagram of the transmission structure according to the third embodiment of the present application. As shown in the figure, according to the present embodiment, the transmission line 50 is not straight. Instead, the transmission line 50 includes a plurality of depression parts 57, 58, 59. The short-circuit points SP1, SP2, SP3 are located at the depression parts 57, 58, 59, respectively. Namely, the radio-frequency short-circuit elements 72, 74, 76 coupled to the short-circuit points SP1, SP2, SP3 are located at the depression parts 57, 58, 59, respectively. Thereby, the radio-frequency short-circuit elements 72, 74, 76 are more concentrated with shorter distances in the lateral direction. On the contrary, the radio-frequency short-circuit elements 72, 74, 76 shown in FIG. 2 are more separate, meaning that the mutual lateral distances are far. Thereby, according to the present embodiment, the distances between the radio-frequency short-circuit elements 72, 74, 76 and the selection circuit 90 are similar, and hence the distances between the radio-frequency short-circuit elements 72, 74, 76 and the ground are similar. Consequently, the short-circuit performances of the radio-frequency short-circuit elements 72, 74, 76 in guiding the radio-frequency signal RF to the ground will be similar. According to the present embodiment, the transmission line 50 has the shape similar to a square wave. Nonetheless, the present application is not limited to the shape. Like the above description, the distances between the short-circuit points SP1, SP2, SP3 coupled by the radio-frequency short-circuit elements 72, 74, 76 and the first coupling end 52 along the transmission line 50 may be determined by the frequency band of the antenna 32 and are between ¼ wavelength of the radio-frequency signal RF±⅛ wavelength of the radio-frequency signal RF.

Figure 4:
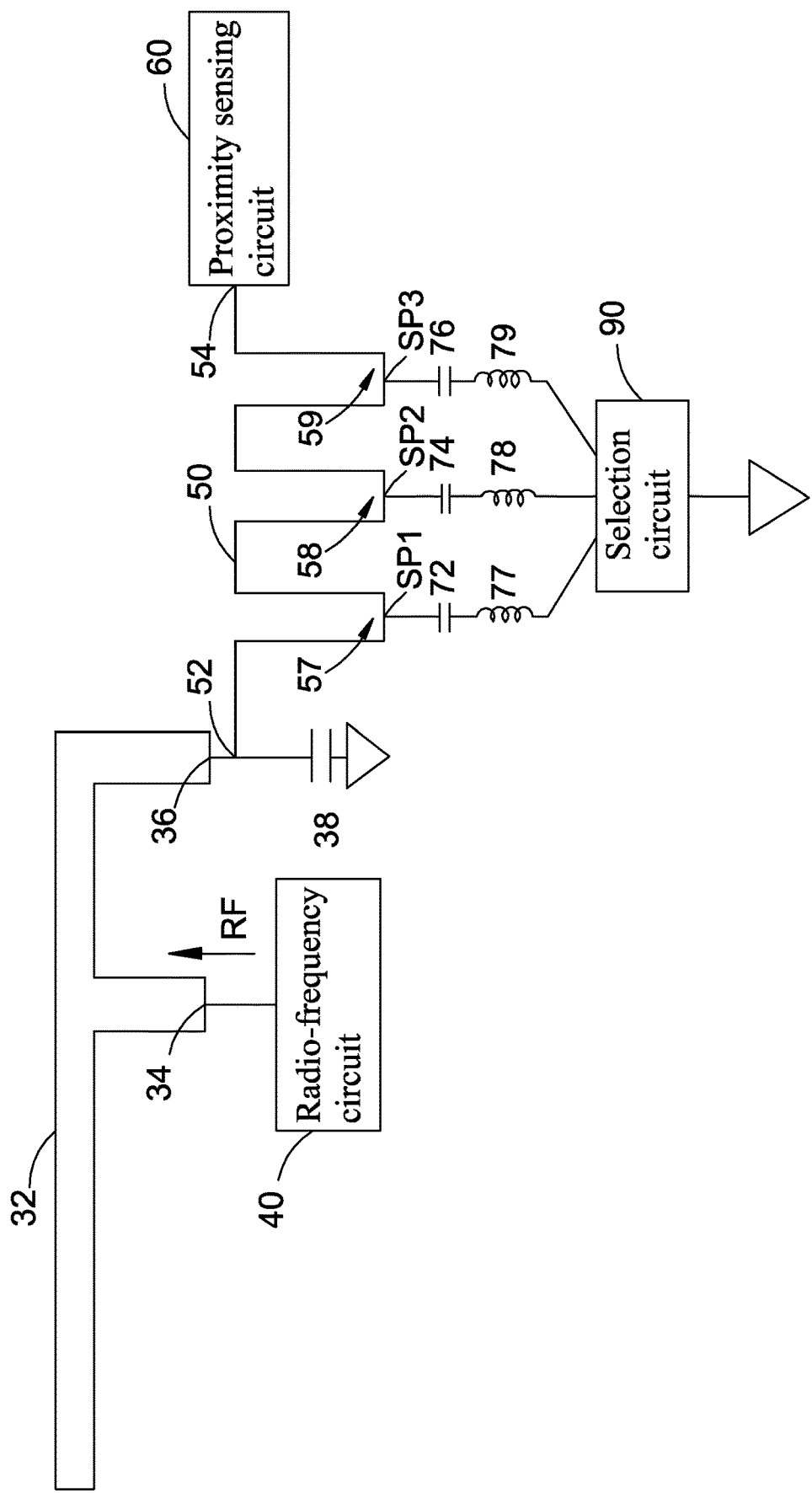
FIG. 4 shows a schematic diagram of the transmission structure according to the fourth embodiment of the present application.

Please refer to FIG. 4, which shows a schematic diagram of the transmission structure according to the fourth embodiment of the present application. As shown in the figure, according to the present embodiment, the transmission structure may further comprise a plurality of inductors 77, 78, 79 connected in series with the radio-frequency short-circuit elements 72, 74, 76, respectively. The inductors 77, 78, 79 are located between the radio-frequency short-circuit elements 72, 74, 76 and the selection circuit 90. According to the present embodiment, since the inductors 77, 78, 79 will resonate with the radio-frequency short-circuit elements 72, 74, 76, the impedance between the radio-frequency short-circuit elements 72, 74, 76 and the ground will be lowered. Thereby, capacitors with smaller capacitance may be used as the radio-frequency short-circuit elements 72, 74, 76. Since the proximity sensing circuit 60 is used for sensing capacitance, by reducing the capacitance of the radio-frequency short-circuit elements 72, 74, 76, the influence on the proximity sensing circuit 60 will be lowered and hence improving the sensing accuracy of the proximity sensing circuit 60.

To sum up, the present application provides a transmission structure of antenna and proximity sensing circuit, which comprises a transmission line and at least one radio-frequency short-circuit element. The at least one radio-frequency short-circuit element is coupled between the transmission line and the ground. Thereby, the transmission path between the antenna and the proximity sensing circuit has high impedance for avoiding the influence of the radio-frequency signal of the antenna on the sensing of the proximity sensing circuit and thus improving the sensing accuracy of the proximity sensing circuit.

Those skilled in the art will readily observe that numerous modifications and alterations of the circuit and structure may be made while retaining the teachings of the invention. Accordingly, the above disclosure should be construed as limited only by the metes and bounds of the appended claims.

The invention claimed is:

1. A transmission structure of antenna and proximity sensing circuit, comprising:
- a transmission line, having a first coupling end and a second coupling end, said first coupling end coupled to an antenna, and said second coupling end coupled to a proximity sensing circuit;
- a plurality of radio-frequency short-circuit elements, coupled between said transmission line and a ground, and located between said antenna and said proximity sensing circuit; and
- a selection circuit, coupled between said radio-frequency short-circuit elements and said ground, and selecting one of said radio-frequency short-circuit elements to be coupled to said ground;
- wherein said radio-frequency short-circuit elements are coupled to a plurality of short-circuit points of said transmission line, respectively; said short-circuit points are located at different locations of said transmission line; a plurality of distances between said first coupling end of said transmission line and said short-circuit points are between ¼ wavelength of a plurality of radio-frequency signals ±⅛ wavelength of said radio-frequency signals, respectively; and the frequencies of said radio-frequency signals are different.

2. The transmission structure of antenna and proximity sensing circuit of claim 1, wherein when said radio-frequency signal is guided to said ground by one of said radio-frequency short-circuit elements, an impedance of a transmission path of said transmission line transmitting said radio-frequency signal from said antenna to said proximity sensing circuit is increased.

3. The transmission structure of antenna and proximity sensing circuit of claim 1, wherein said antenna has a feed end and a ground end; said feed end is coupled to a radio-frequency circuit; and said ground end of said antenna is coupled to said transmission line.

4. The transmission structure of antenna and proximity sensing circuit of claim 3, wherein said radio-frequency circuit transmits said radio-frequency signal to said antenna.

5. The transmission structure of antenna and proximity sensing circuit of claim 1, wherein said at least one radio-frequency short-circuit elements include a plurality of capacitors.

6. The transmission structure of antenna and proximity sensing circuit of claim 1, further comprising:
  a plurality of inductors, connected in series with said radio-frequency short-circuit elements, respectively, and located between said radio-frequency short-circuit elements and said selection circuit.

7. A transmission structure of antenna and proximity sensing circuit, comprising:
  a transmission line, having a first coupling end and a second coupling end, said first coupling end coupled to an antenna, and said second coupling end coupled to a proximity sensing circuit;
  a plurality of radio-frequency short-circuit elements, coupled between said transmission line and a ground, and located between said antenna and said proximity sensing circuit; and
  a selection circuit, coupled between said radio-frequency short-circuit elements and said ground, and selecting one of said radio-frequency short-circuit elements to be coupled to said ground;
  wherein said transmission line is not straight; said transmission line includes a plurality of depression parts; and said radio-frequency short-circuit elements are located at said depression parts, respectively.

8. The transmission structure of antenna and proximity sensing circuit of claim 7, wherein said radio-frequency short-circuit elements are coupled to a plurality of short-circuit points of said transmission line, respectively; said short-circuit points are located at different locations of said transmission line; a plurality of distances between said first coupling end of said transmission line and said short-circuit points are between ¼ wavelength of a plurality of radio-frequency signals ±⅛ wavelength of said radio-frequency signals, respectively; and the frequencies of said radio-frequency signals are different.

9. The transmission structure of antenna and proximity sensing circuit of claim 7, wherein said antenna has a feed end and a ground end; said feed end is coupled to a radio-frequency circuit; and said ground end of said antenna is coupled to said transmission line.

10. The transmission structure of antenna and proximity sensing circuit of claim 9, wherein said radio-frequency circuit transmits a radio-frequency signal to said antenna.

11. The transmission structure of antenna and proximity sensing circuit of claim 7, wherein said radio-frequency short-circuit elements include a plurality of capacitors.

12. The transmission structure of antenna and proximity sensing circuit of claim 7, further comprising:
  a plurality of inductors, connected in series with said radio-frequency short-circuit elements, respectively, and located between said radio-frequency short-circuit elements and said selection circuit.

* * * * *